United States Patent Office 3,260,729
Patented July 12, 1966

3,260,729
BENZOATE OF 1-(6'-METHOXY-3'-INDOLYL)-2-PROPYLAMINE
Andre Allais, Paris, France, assignor to Roussel-Uclaf, S.A., Paris, France, a corporation of France
No Drawing. Filed Oct. 16, 1962, Ser. No. 230,989
Claims priority, application France, Sept. 30, 1957, 748,371; July 17, 1962, 904,208
1 Claim. (Cl. 260—326.14)

The present invention relates to 1-(6'-methoxy-3'-indolyl)-2-propylamine, its therapeutically-compatible acid addition salts, as well as to its preparation, compositions containing the same and use of the compositions.

This application is a continuation-in-part of our co-pending United States patent application Serial No. 760,536, filed September 12, 1958, and now abandoned.

It is an object of the present invention to proivde 1-(6'-methoxy-3'-indolyl)-2-propylamine and its therapeutically-compatible acid addition salts.

Another object of the present invention is to provide a sample and effective process of producing 1-(6'-methoxy-3'-indolyl)-2-propylamine, its picrate and acid addition salts and its therapeutically-compatible acid addition salts.

A further object of the present invention is to provide compositions containing an active compound selected from the group consisting of 1-(6'-methoxy-3'-indolyl)-2-propylamine and its therapeutically-compatible acid addition salts, together with an inert excipient.

A yet further object of the present invention is to provide a method for the treatment of anxiety and depressive states which comprises administering a safe but effective amount of a compound selected from the group consisting of 1-(6'-methoxy-3'-indolyl)-2-propylamine and its therapeutically-compatible acid addition salts.

Another object of the present invention is to provide a method for overcoming the depressive action of rauwolfia drugs which comprises administering a safe but effective amount of a compound selected from the group consisting of 1-(6'-methoxy-3'-indolyl)-2-propylamine and its therapeutically-compatible acid addition salts in conjunction with the administration of rauwolfia drugs.

These and other objects of the invention will become apparent as the description thereof proceeds.

In principle, the present invention relates to the tryptamine compound 1 - (6'-methoxy-3'-indolyl)-2-propylamine of the Formula I

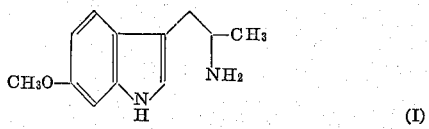

(I)

and to the addition salts thereof.

The compound of the invention, 1-(6'-methoxy-3'-indolyl)-2-propylamine, I, is useful as an intermediate in the synthesis of physiologically active compounds of the reserpine series. In particular, it is an intermediate useful in the production of 5-methyl reserpine. In addition, the product of the invention, as well as its therapeutically-compatible acid addition salts, is endowed with interesting pharmacological properties. It possesses particularly a psychotonic and stimulating action. It can be used for the treatment of anxiety states in general medicine and depressive syndromes in psychiatric medicine. It also has an antagonistic effect with respect to the depressive action of reserpine and other rauwolfia drugs. It can be utilized to overcome the depressive action of reserpine. This action is unexpected and is not associated with closely related tryptamines.

The new medicine for the treatment of depressive states or anxiety is 1-(6'-methoxy-3'-indolyl)-2-propylamine in the form of its free base or salt form with a therapeutically-compatible acid prepared in view of usage as a medicine as well as compositions containing it. 1-(6'-methoxy-3'-indolyl)-2-propylamine corresponds to the formula:

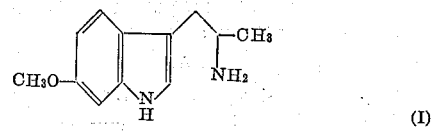

(I)

1-(6'-methoxy-3'-indolyl)-2-propylamine occurs in the form of a very viscous, orange colored oil and it is soluble in alcohol and chloroform, and insoluble in water, ether and benzene. The picrate of 1-(6'-methoxy-3'-indolyl)-2-propylamine possesses a melting point of 227° C. (decomposition).

The benzoate of 1-(6'-methoxy-3'-indolyl)-2-propylamine occurs in the form of a colorless solid crystallized in prisms and is soluble in water and dilute aqueous acids and insoluble in ether and benzene. Its melting point is 187°±2°.

1-(6'-methoxy-3'-indolyl)-2-propylamine is prepared according to a process which may be illustrated by the following reaction flow sheet:

TABLE I

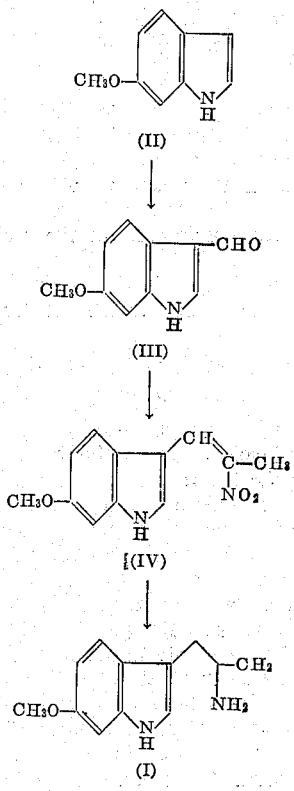

According to the process of the present invention 6-methoxy indole of Formula II is subjected to the action of dimethylformamide in the presence of phosphorus oxychloride. The resulting formyl indole compound of Formula III is then reacted with nitroethane in benzene solution and in the presence of piperidine, whereby 1-(6'-methoxy-3'-indolyl)-2-nitro-1-propene of Formula IV is obtained which is reduced by means of lithium-aluminum hydride in tetrahydrofuran. The resulting crude 1-(6'-methoxy-3'-indolyl)-2-propylamine of Formula I is isolated by conversion into its crystalline picrate which is decomposed by the action of an alkali metal hydroxide solution to the free amino compound.

The benzoate of 1-(6'-methoxy-3'-indolyl)-2-propylamine, Ia, is prepared starting from the picrate of 1-(6'-methoxy-3'-indolyl)-2-propylamine (Ib) which is subject to the action of an alkaline base and the resultant free base (I) is transformed by means of benzoic acid into the desired corresponding addition salt (Ia). The reaction is completed in an appropriate solvent such as benzene.

The following is a flow diagram of preparation of the benzoate salt, compound Ia:

TABLE II

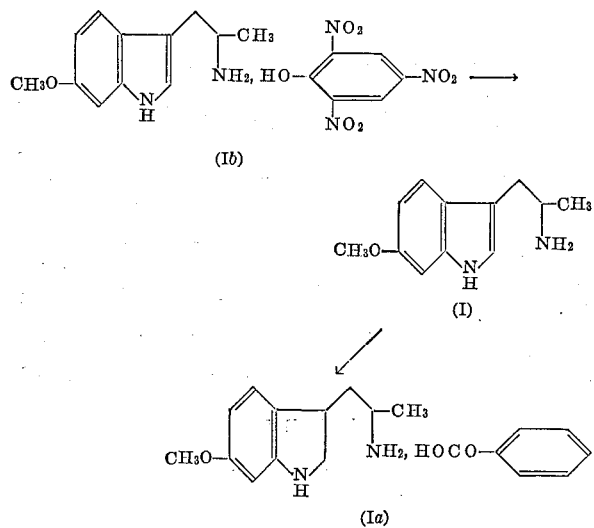

The following examples serve to illustrate the present invention without, however, limiting the same thereto. More particularly, the nature of the solvents and of the basic agents used in the reaction and the like may be varied by those skilled in the art in accordance with the principles set forth herein and in the claim annexed hereto.

The melting points given in the examples are instantaneous melting points determined on the Maquenne block.

*Example 1.—Preparation of 3-formyl-6-methoxy indole (Formula III)*

138.3 g. of phosphorus oxychloride were added to 385 g. of dimethylformamide within one hour under anhydrous conditions while the temperature of the reaction mixture was kept at about $+10°$ C. After addition was completed, 66.3 g. of 6-methoxy indole of Formula II were added portion by portion to the reaction mixture in such a manner that the reaction temperature did not rise above 25° C. The mixture was stirred at the same temperature for two hours. 180 g. of calcium carbonate were then added very slowly thereto. The temperature of the mixture rose to about 60° C. and was kept at said temperature for half an hour until no more carbon dioxide was generated. After cooling to $+10°$ C., the resulting mixture was suspended in 900 cc. of a 30% sodium acetate solution. The solution was diluted with water to a volume of 4,500 cc. 213 g. of sodium hydroxide pellets were added thereto. The mixture was refluxed for 3 hours while dimethylamine was evolved. The reaction mixture was cooled and allowed to stand in ice for one hour. The precipitate was separated by centrifuging and washed by trituration with water. After drying in a vacuum, 275 g. of a dry powder representing a mixture of 3-formyl-6-methoxy indole of Formula III and calcium salts was obtained. In order to isolate the formyl indole compound, 75 g. of said powder were dissolved in water and refluxed. The solution was filtered while hot and then cooled in ice for one hour. 16.2 g. (75.6% of the theoretical yield calculated for 6-methoxy indole used as starting material) of crystals of 3-formyl-6-methoxy indole of Formula III were obtained. The compound crystallized in the form of needles. It had a melting point of 185° C., was soluble in alcohol and acetone and insoluble in ether, benzene, and chloroform. It could be recrystallized from water.

*Analysis.*—$C_{10}H_9O_2N$, molecular weight=175.18; calculated: 68.56% C; 5.18% H; 18.27% O; 8.00% N. Found: 68.6% C; 5.4% H; 18.1% O; 8.1% N.

The compound is identical with the compound described in the literature.

*Example 2.—Preparation of 1-(6'-methoxy-3'-indolyl)-2-nitro-1-propene (Formula IV)*

40 g. of 3-formyl-6-methoxy indole obtained according to Example 1 were suspended in 1600 cc. of benzene. The solution was refluxed for 15 minutes. 12 cc. of piperidine and 60 cc. of nitroethane were added thereto. The solution was refluxed for 5 hours while water was removed by azeotropic distillation. 4.5 cc. of water were collected. After cooling to 5° C., the precipitate was filtered with suction and triturated with benzene. The solid material was then filtered with suction and dried. 34.6 g. (65% of the theoretical yield) of red prismatic crystals of 1-(6'-methoxy-3'-indolyl)-2-nitro-1-propene of Formula III were obtained. The new compound had a melting point of 179° C. It was soluble in warm alcohol, acetone, and benzene, and very soluble in tetrahydrofuran.

*Analysis.*—$C_{12}H_{12}O_3N_2$, molecular weight=232.24; calculated: 62.06% C; 5.21% H; 20.67% O; 12.06% N. Found: 62.3% C; 5.3% H; 20.8% O; 12.1% N.

*Example 3.—Preparation of the picrate of 1-(6'-methoxy-3'-indolyl)-2-propylamine (Formula Ib)*

17.5 g. of lithium-aluminum hydride were dissolved in 1,250 cc. of anhydrous tetrahydrofuran and a solution of 10 g. of the nitro compound obtained according to the preceding example, dissolved in 150 cc. of tetrahydrofuran, were added thereto within 45 minutes. The resulting solution was refluxed for 5 hours. After cooling in ice, 150 cc. of water were carefully added thereto. Lithium hydroxide and aluminum hydroxide were filtered off and extracted with tetrahydrofuran. After combining the tetrahydrofuran solutions, the solvent was removed by distillation and the remaining aqueous solution was extracted with benzene. The benezene layer was dried over sodium sulfate, filtered, and evaporated to dryness in a vacuum. 9 g. of a yellow residue were obtained which was dissolved in ethanol and treated with a 5% solution of picric acid in ethanol. The mixture was cooled in ice for 2 hours, filtered with suction, the crystals were triturated with ethanol, and again filtered with suction. After drying at 55° C. in a vacuum, 13.55 g. (73% of the theoretical yield) of the picrate of 1-(6'-methoxy-3'-indolyl)-2-propylamine were obtained. The new compound had a melting point at 227° C. (with decomposition). It formed brownish-red crystals which were soluble in hot alcohol and in dimethylformamide, slightly soluble in acetone, and insoluble in ether.

*Analysis.* — $C_{18}H_{19}O_8N_5$, molecular weight=433.37; calculated: 49.88% C; 4.42% H; 29.54% O; 16.16% N. Found: 50.0% C; 4.5% H; 29.7% O; 16.0% N.

Example 4.—Preparation of 1-(6'-methoxy-3'-indolyl)-2-propylamine (Formula I)

25 gm. of the picrate of 1-(6'-methoxy-3'-indolyl)-2-propylamine (Ib) were placed in suspension in 1 liter of methylene chloride. 330 cc. of a solution of 200 gm. of lithium hydroxide in 1000 cc. of water were added. The organic phase was separated. The aqueous phase was extracted with methylene chloride. The combined organic solutions were washed successively with a mixture of 50% of the above lithium hydroxide solution with a saturated sodium chloride solution and several times with a saturated sodium chloride solution. The organic phase was dried over solid potassium hydroxide, filtered and evaporated to dryness under vacuum. 10.5 gm. of the free base of 1-(6'-methoxy-3'-indolyl)-2-propylamine (I) were obtained which were used as such for the following step of the synthesis. The product was obtained in the form of a very viscous, orange colored oil and it was soluble in alcohol and chloroform and insoluble in water, ether and benzene. The infrared spectra of the product corresponds to the assumed structure of 1-(6'-methoxy-3'-indolyl)-2-propylamine of Formula I.

This compound has not been described in the literature.

Example 5.—Preparation of the benzoate of 1-(6'-methoxy-3'-indolyl)-2-propylamine (Formula Ia)

All of the product obtained from the preceding example was dissolved in 300 cc. of hot benzene, and a hot solution of 7 gm. of benzoic acid in 100 cc. of benzene was added. The reaction mixture was allowed to stand at rest overnight at room temperature. Then the crystals formed were vacuum filtered. These crystals were washed successively with benzene and ether, dried under vacuum and 16.3 gm. of the benzoate of 1-(6'-methoxy-3'-indolyl)-2-propylamine (Ia) were obtained having a melting point of 187° C.±2° which could be recrystallized from dioxane.

The product was soluble in water and dilute aqueous acids, insoluble in ether and benzene. Dilute aqueous alkalis decomposed it.

Analysis.—$C_{19}H_{22}O_3N_2$, molecular weight=326.39; calculated: C, 69.92%; H, 6.79%; N, 8.58%. Found: C, 69.9%; H, 6.7%; N, 8.5%.

This compound is not described in the literature.

Other therapeutically-compatible acids can be substituted for the benzoic acid in the above to produce other therapeutically-compatible acid addition salts of 1-(6'-methoxy-3'-indolyl)-2-propylamine. Among such therapeutically-compatible acids are acetic acid, propionic acid, citric acid, succinic acid, etc.

As stated hereinabove, the new tryptamine compound according to the present invention is a useful intermediate in the synthesis of physiologically active compounds of the reserpine series. For instance, 1-(6'-methoxy-3'-indolyl)-2-propylamine may be reacted with the dextrorotatory methyl ester of 1β-carboxy methyl-2β-carbomethoxy-3α-methoxy-4β-acetoxy-6β-formyl cyclohexane in a neutral solvent. The resulting condensation product is then subjected to the action of potassium borohydride in a lower alkanol, whereby 5-methyl-11-methoxy-16β-carbomethoxy-17α-methoxy-18β-hydroxy-3-oxo-2,3-seco-20α-yohimbane is obtained which is esterified in 18-position by means of 3,4,5-trimethoxy benzoic acid anhydride in the presence of a pyridine base and of triethylamine. Said 18-ester compound is heated with phosphorus oxychloride to cause ring closure. By reducing the resulting unsaturated quaternary ammonium compound by means of zinc in the presence of perchloric acid and in a water miscible solvent, 5-methyl reserpine is obtained.

Therapeutically, 1-(6'-methoxy-3'-indolyl)-2-propylamine and its therapeutically-compatible acid addition salts can be utilized in the form of injectable aqueous solutes, injectable aqueous suspensions, tablets, syrups or suppositories.

The useful dosology is controlled between 100 mg. and 1 gm. per day in the adult.

The usual pharmaceutical forms such as injectable solutes or suspensions, tablets, syrups and suppositories are prepared according to the usual processes.

Example 6.—Pharmacological study of 1-(6'-methoxy-3'-indolyl)-2-propylamine (1) *Symptomology.*—The intraperitoneal injection in mice of 1-(6'-methoxy-3'-indolyl)-2-propylamine or its salts produces an important excitation of the animals with piloerection, sudation, and exophthalmia. Large doses of 100 to 200 mg./kg. bring on trembling, aggressivity and even convulsive movements preceding death which occurred quite rapidly, about 3 hours after injection of elevated doses.

(2) *Potentialization of symptoms by the pretreatment with N-(isonicotinoyl)-N'-isopropyl-hydrazine.*—24 hours before the injection of 1-(6'-methoxy-3'-indolyl)-2-propylamine, the animals received, by intraperitoneal injection, N-(isonicotinoyl)-N'-isopropylhydrazine at a dose of 100 mg./kg. This dose by itself caused no symptomology.

The next day, the animals grouped by lots of five, received, respectively:

(a) Control lot: 0
(b) Treated lots:
   50 mg./kg.
   100 mg./kg.
   200 mg./kg.

of 1-(6'-methoxy-3'-indolyl)-2-propylamine.

One hour after this injection and for a period of several hours, the phenomena of excitation appeared very amplified, comparable at a dose of 50 mg./kg. to those observed with the injected compound alone at a double dose at least.

Another group of animals received in an analogous manner:

0 mg./kg. of the benzoate of 1-(6'-methoxy-3-indolyl)-2-propylamine 20 mg./kg. of the benzoate of 1-(6'-methoxy-3-indolyl)-2-propylamine 50 mg./kg. of the benzoate of 1-(6'-methoxy-3-indolyl)-2-proylamine The same symptomology appeared almost comparably at 20 mg./kg. to that observed after injection of 50 mg./kg. of the compound injected alone. A very clear reinforcement of the physiological activity of the medicine by previous administration of a non-active dose of N-(isonicotinoyl)-N'-isopropyl-hydrazine was shown.

(3) *Inhibition of the sedative effect of reserpine.*—Several lots of five mice each received intraperitoneally a dose of reserpine corresponding to 2 mg./kg. One lot was separated and received no other medicine. The other lots received, two hours previous to the injection of reserpine, an injection of 1-(6'-methoxy-3'-indolyl)-2-propylamine at doses, respectively, of 2, 5, 10, 20, 50 and 100 mg./kg.

Other lots received in a similar manner an injection of the benzoate of 1-(6'-methoxy-3'-indolyl)-2-propylamine at doses of 20, 50 and 100 mg./kg., respectively.

Finally, another group of animals received the medicine under the same conditions and in the same doses four hours after the injection of reserpine rather than previous to the administration of reserpine.

Next, the antagonistic action with reference to reserpine was determined by measurement of the sedative effect in the test of the ptosis of the eyelids.

The test of the ptosis of the eyelids is effected according to the method described and codified by Rubin et al., J. Pharm. Exp. Therap., 1957, 120, p. 125.

The values assembled in the table below represent the values supplied by the reading of each eye of the mice following a code going from 0 for the absence of ptosis to 4 for the complete closure of the eyelids. The maximum points for a lot is, under these conditions, 40. The measurements were effected from hour to hour for a period of 7 hours which followed the injection of reserpine.

The degree of ptosis obtained in the controls not having received the medicine and having received only 2 mg./kg. of reserpine was found equal to about 30 at the maximum of the sedative effect of reserpine.

TABLE III.—PREVENTATIVE EFFECT OF THE MEDICINE WITH REFERENCE TO THE SEDATIVE EFFECT OF RESERPINE

| Reserpine at 0 time—Medicine at −2 hours, Doses in mg./kg. | 1-(6'-methoxy-3'-indolyl)-2-propylamine—read at 5th hour after reserpine injection | 1-(6'-methoxy-3'-indolyl)-2-propylamine (benzoate)—read at the 5th hour after reserpine injection |
| --- | --- | --- |
| 2 | 22 | |
| 5 | 15 | |
| 10 | 15±1 | |
| 20 | 13 | 16 |
| 50 | 0 | 14.5±1.5 |
| 100 | 0 | 8 |

In Table III, the results of the administration of the medicine 2 hours before the administration of reserpine were assembled. Five hours after administration of reserpine, the effect is maximal. The injection of either 5 mg./kg. of 1-(6'-methoxy-3'-indolyl)-2-propylamine or 20 mg./kg. of the benzoate of 1-(6'-methoxy-3'-indolyl)-2-propylamine two hours before the injection of reserpine diminished by 50% the sedative effect of reserpine.

TABLE IV.—CURATIVE EFFECT OF THE MEDICINE WITH REFERENCE TO THE SEDATIVE EFFECT OF RESERPINE

| Reserpine T Time—Medicine T+4 Hours, Doses in mg./kg. | 1-(6'-methoxy-3'-indolyl)-2-propylamine | | 1-(6'-methoxy-3'-indolyl)-2-propylamine (benzoate) | |
| --- | --- | --- | --- | --- |
| | Reading at T+4 hours | Reading at T+5 hours | Reading at T+4 hours | Reading at T+5 hours |
| 2 | 29 | 22 | | |
| 5 | 28 | 14 | | |
| 10 | 31±1 | 11.5±0.5 | | |
| 20 | 30 | 8 | 31±3 | 3–4 |
| 50 | 30 | 2 | 28±2 | 0–2 |
| 100 | 29 | 4 | 32 | 0 |

In Table IV, the results showing the curative effects of the medicine with reference to the sedative effect of reserpine were assembled. The medicine was injected 4 hours after the reserpine injection (T+4 hours). The readings were made immediately and one hour after the injection of the medicine and show a curative effect of 50% for a dose of 1-(6'-methoxy-3'-indolyl)-2-propylamine equal to 5 mg./kg. The benzoate of 1-(6'-methoxy-3'-indolyl)-2-propylamine assured an almost integral protection with a dose of 20 mg./kg.

(4) *Effect on sleep caused by barbiturates.*—Sleep was provoked in mice by the intravenous injection of a dose of Amobarbital corresponding to 80 mg./kg. The duration of sleep was evaluated by considering the period during which the mice presented no righting reflex.

The medicine was injected intraperitoneally at the start of barbiturate sleep at doses of 10 and 20 mg./kg. of the benzoate of 1-(6' - methoxy-3'-indolyl)-2-propylamine. The duration of sleep was as follows:

TABLE V

| Control Lot | Benzoate of 1-(6-methoxy-3'-indolyl)-2-propylamine | |
| --- | --- | --- |
| | 10 mg./kg. | 20 mg./kg. |
| 28.7 min | 31 min | 19.6 min |

A dose of 20 mg./kg. appeared thus to diminish the sleep caused by barbiturates in an important amount.

(5) *Effect of the medicine with reference to the maximal crises released by electric shock.* (a) *In acute tests.*—Intraperitoneal injection of a solution of the benzoate of 1-(6'-methoxy-3'-indolyl)-2-propylamine at a dose of 20 mg./kg. a half hour before electric shock diminishes in rats the number of maximal crises of from 7/10 to 3/10, whereas the number of crises remains constant in control rats which receive only an injection of physiological serum (9/10 and 9/10).

(b) *In chronic tests.*—After continuous administration for a period of 5 weeks of a dose of 1.2 and 5 mg./kg. per day subcutaneously of the benzoate of 1-(6'-methoxy-3'-indolyl)-2-propylamine, the number of maximal crises for a determined intensity of electric current in each group of rats was investigated. The results obtained are the following:

TABLE VI

| Control Lot | Treated Lot | | |
| --- | --- | --- | --- |
| | 1 mg./kg. | 2 mg./kg. | 5 mg./kg. |
| 1/10 | 2/10 | 6/9 | 6/10 |

This shows that the compound gradually increased the cortical excitability when it is administered at a moderate dose in a chronic fashion, whereas the acute administration of elevated doses diminished paradoxically the number of maximal crises. This has been observed with a certain number of excitant compounds.

*Determination of acute toxicity.*—Tests of acute toxicity were made on lots of 10 mice of the Rockland strain weighing between 18 and 22 grams.

1-(6'-methoxy-3'-indolyl)-2-propylamine was placed in solution in water acidulated with hydrochloric acid at a concentration of 20 mg. per cc. The benzoate of 1-(6'-methoxy-3'-indolyl)-2-propylamine was placed in solution in physiological serum at a concentration of 10 mg./cc. The two products were injected by intraperitoneal methods to lots of mice in a volume of 0.01 cc./gm. of mouse at doses, respectively, of 20, 50, 100 and 200 mg./kg.

The animals were held under observation for a period of 7 days. The following results were obtained:

TABLE VII.—MORTALITY

| Doses | 20 mg./kg. | 50 mg./kg. | 100 mg./kg. | 200 mg./kg. |
| --- | --- | --- | --- | --- |
| 1-(6-methoxy-3'-indolyl)-2-propylamine | | 1/5 | 4/5 | 5/5 |
| Benzoate of 1-(6'-methoxy-3'-indolyl)-2-propylamine | 0/5 | 0/5 | 3/5 | |

The mean lethal dose ($DL_{50}$) was found for 1-(6'-methoxy-3'-indolyl)-2-propylamine and for the benzoate of 1-(6'-methoxy-3'-indolyl)-2-propylamine to be between 50 and 100 mg./kg.

The above examples are illustrative of the invention without, however, limiting the same, and enable those skilled in the art to understand the invention. It is obvious that other expedients may be employed without departing from the spirit of the invention or the scope of the appended claim.

I claim:

The benzoate of 1 - (6' - methoxy-3'-indolyl)-2-propylamine.

(References on following page)

References Cited by the Examiner

UNITED STATES PATENTS

| | | | |
|---|---|---|---|
| 2,494,031 | 1/1950 | Brooker et al. | 260—240.4 |
| 2,814,625 | 11/1957 | Speeter | 260—319 |
| 2,850,520 | 9/1958 | Merian et al. | 260—465 |
| 2,921,069 | 1/1960 | Ullyot | 260—243 |
| 2,980,692 | 4/1961 | Albertson | 260—319 |
| 2,986,573 | 5/1961 | Topliss et al. | 167—65 |
| 2,995,556 | 8/1961 | Sletzinger et al. | 260—319 |
| 3,004,889 | 10/1961 | Kuna et al. | 167—65 |
| 3,042,684 | 7/1962 | Young | 260—319 |
| 3,058,992 | 10/1962 | Allais et al. | 260—319 |

OTHER REFERENCES

Vane et al., Nature (London), vol. 191, Sept. 9, 1961.

ALEX MAZEL, *Primary Examiner.*

IRVING MARCUS, NICHOLAS S. RIZZO, WALTER A. MODANCE, *Examiners.*

E. E. BERG, M. O'BRIEN, *Assistant Examiners.*